US005907827A

United States Patent [19]

Fang et al.

[11] Patent Number: 5,907,827

[45] Date of Patent: May 25, 1999

[54] CHANNEL SYNCHRONIZED AUDIO DATA COMPRESSION AND DECOMPRESSION FOR AN IN-FLIGHT ENTERTAINMENT SYSTEM

[75] Inventors: Calvin Fang, Hacienda Heights; Clayton Backhaus, Riverside; Mike Densham, San Juan Capistrano; Daniel Lotocky, Fullerton; Kazuo Takata, Placentia, all of Calif.

[73] Assignees: Sony Corporation, Tokyo, Japan; Sony Trans Com Inc., Irvine, Calif.

[21] Appl. No.: 08/787,690

[22] Filed: Jan. 23, 1997

[51] Int. Cl.[6] .................................. G10L 3/02; H04J 3/06

[52] U.S. Cl. ................................ 704/503; 381/81; 455/3.1

[58] Field of Search ............................ 704/503; 381/81; 455/3.1; 348/8

[56] References Cited

U.S. PATENT DOCUMENTS

| | | | |
|---|---|---|---|
| 5,289,272 | 2/1994 | Rabowsky et al. | 348/8 |
| 5,596,647 | 1/1997 | Wakai et al. | 381/77 |
| 5,600,365 | 2/1997 | Kondo et al. | 348/8 |
| 5,617,331 | 4/1997 | Wakai et al. | 455/3.1 |
| 5,666,151 | 9/1997 | Kondo et al. | 348/8 |

*Primary Examiner*—David R. Hudspeth
*Assistant Examiner*—Tālivaldis Ivars Šmits
*Attorney, Agent, or Firm*—Blakely, Sokoloff, Taylor & Zafman LLP

[57] ABSTRACT

In an In-Flight Entertainment System (IFES), an audio distribution system transmits and synchronizes an audio data stream from multiple audio channels using the Adaptive Differential Pulse Code Modulation (ADPCM) technique for efficient transmission and preventing loss of synchronization. An encoder digitizes the analog audio signals, compresses the digital data, generates the synchronization parameters, including synchronization data for a selected channel, and creates a data frame to be transmitted to a number of decoders. Each decoder detects the synchronization header, extracts the compressed data patterns from the passenger selections, updates the ADPCM synchronization parameters, decompresses the compressed data patterns, and converts the digital audio data to analog audio signals to be delivered to the passenger seats.

22 Claims, 8 Drawing Sheets

CHANNEL SYNCHRONIZED AUDIO DATA COMPRESSION AND DECOMPRESSION FOR AN IN-FLIGHT ENTERTAINMENT SYSTEM

BACKGROUND OF THE INVENTION

1. Field of the Invention

This invention relates to compressed multi-channel hi-fidelity digital audio system used in In-Flight Entertainment Systems on aircraft. In particular, the invention relates to multi-channel compression of audio signals.

2. Description of Related Art

In-Flight Entertainment Systems (IFES) are now becoming popular on commercial aircraft. A typical new IFES may offer a variety of services including music, news, movies, video on demand, telephone, and games to passengers right at the passengers' seats with the convenience of individualized control. A timetable is generally provided from which a passenger may choose options when he or she requests services.

A typical IFES involves a number of audio channels to provide a variety of entertainment, news, and business programs. In audio transmission, digital techniques are usually employed to offer hi-fidelity. To utilize the transmission bandwidth efficiently, audio signals are typically compressed using the standard Adaptive Differential Pulse Code Modulation (ADPCM) method. The basic algorithm for the compression of 16-bit linear data to 4-bit ADPCM data and the decompression of 4-bit ADPCM data to 16-bit linear data works as follows. The algorithm finds the difference between the original 16-bit data and the predicted value. Since the difference tends to be of small value, it is usually represented by a smaller number of bits. This difference is quantized to a 4-bit compressed pattern using the quantizer step size. To decompress, the 4-bit compressed pattern is expanded using the same quantization step size to obtain the same linear difference. To correct for any truncation errors, a binary representation of a value of 0.5 is added during the decompression. This difference is then added to the predicted value to form a prediction for the next sequential original 16-bit data. The 4-bit compressed pattern is used to adjust an index into a step size table. This index points to a new step size in the step size table. The index variable and the predicted sample are the two important parameters for decompression.

Since the standard ADPCM algorithm encodes only the difference between consecutive samples, any transmission line error or drop-out of samples will lead to data errors. These data errors are cumulative and are not recoverable.

In systems using the ADPCM technique, the issues involving synchronization and random accessibility are not resolved. Presently, there is no means for the receiver (decoder) to know if the index variable and the predicted sample it is generating for decompression are the same as those generated by the transmitter (encoder). Therefore, if there is loss of data, the receiver cannot recover the error and continues to produce erroneous decompressed data. The errors accumulate and eventually cause unacceptable signal quality. When this happens the system collapses and some kind of restart or reset procedure has to be done to start the entire process all over. Needless to say, this scenario is unacceptable to customers in an IFES environment.

In addition, an IFES multichannel audio distribution system typically transmits or broadcasts all audio channels to receivers installed at every passenger's seat. When all audio signals are transmitted over the transmission medium using ADPCM method, synchronizing of all of these ADPCM samples presents further complexity when a passenger accesses the network randomly.

It is therefore desirable to have a system that provides a synchronization mechanism to prevent cumulative loss of data and is adapted for passengers' random access in a multichannel audio distribution system.

SUMMARY OF THE INVENTION

In an In-Flight Entertainment Systems (IFES), an audio distribution system provides synchronization parameters to synchronize data transmission over the audio distribution network. Multiple audio sources are digitized, multiplexed, and compressed using the ADPCM technique. An encoder compresses the data and generates the synchronization parameters to be transmitted with the compressed data over a serial data link. The decoder detects the frame synchronization parameters, extracts the selected data, updates the ADPCM decompression parameters, decompresses the channel data, and converts to analog audio signals.

BRIEF DESCRIPTION OF THE DRAWINGS

The objects, features and advantages of the present invention will become apparent from the following detailed description of the present invention in which.

DESCRIPTION OF THE PRESENT INVENTION

The present invention discloses a method and a system to synchronize digital audio data transmitted from multiple sources using the ADPCM technique. In a multichannel ADPCM system, multiple audio analog signals are digitized, encoded and sent by an encoder on a frame-by-frame basis. The encoder generates the synchronization parameters including a frame header and data synchronization parameters to be transmitted with the compressed data in each frame. The decoder receives, extracts and decompresses the transmitted data to produce audio analog signals. The data synchronization parameters allow the decoder to decompress the ADPCM data correctly at each channel synchronization time so that if there is any data loss between two consecutive channel synchronization times, the error can be corrected quickly within the channel synchronization period.

The data transmission is efficient for a multichannel audio transmission because the additional synchronization bits occupy only a fraction of the entire frame. The synchronization parameters prevent accumulation of errors caused by transmission line or sample drop-out. In addition, the channel synchronization parameters also allow a passenger using a multichannel audio distribution system to switch channels at any time without noticeable audio discontinuities.

Figure 1:
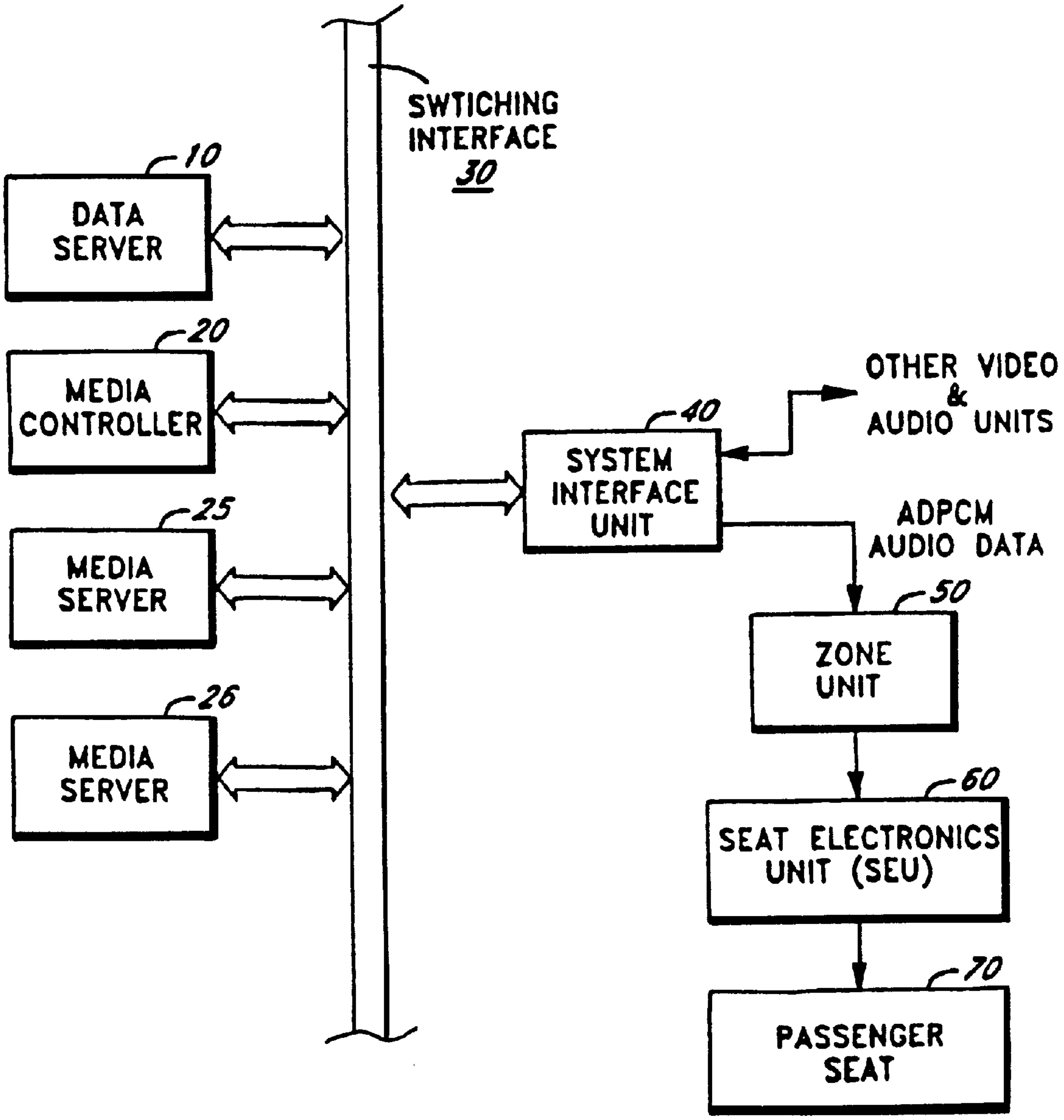
FIG. 1 PRIOR ART
FIG. 1 is a block diagram illustration of the IFES environment of the present invention.

FIG. 1 is an illustration of the IFES environment. The IFES is a digital network for communication and delivery of video and audio entertainment programs on commercial aircraft during flight. Data server 10 stores and transmits data for video programs or games at the passenger's seat electronics units. Media controller 20 schedules video or audio data streams, loads media contents to media servers, and controls trick mode operations such as requests for fast forward, rewind, pause or stop. Media servers 25 and 26 deliver video and audio data to the Seat Electronics Units (SEUs) through switch interface 30. Switch interface 30 may include a number of switching elements for data transmission such as Asynchronous Transfer Mode (ATM) switches. Switch interface 30 routes data to many units or subsystems in the IFES such as the System Interface Unit (SIU) 40. SIU 40 interfaces to a number of video and audio units such as overhead display system, overhead audio system, audio reproduce unit (e.g., Compact Disc player), video reproduce unit (e.g., video cassette player). The SIU transmits ADPCM audio data to a number of zone units, such as zone unit 50, which in turn are coupled to a number of SEUs, such as SEU 60. SEU 60 provides control and data interface to input/output devices at the passenger's seat unit (PSU) 70. The input/output devices at each PSU may include a seat video display (SVD), a passenger's control unit (PCU), an audio output, an input device such as a mouse, a tracking ball, or an entry device, a telephone handset, and a credit card reader, etc.

Figure 2:
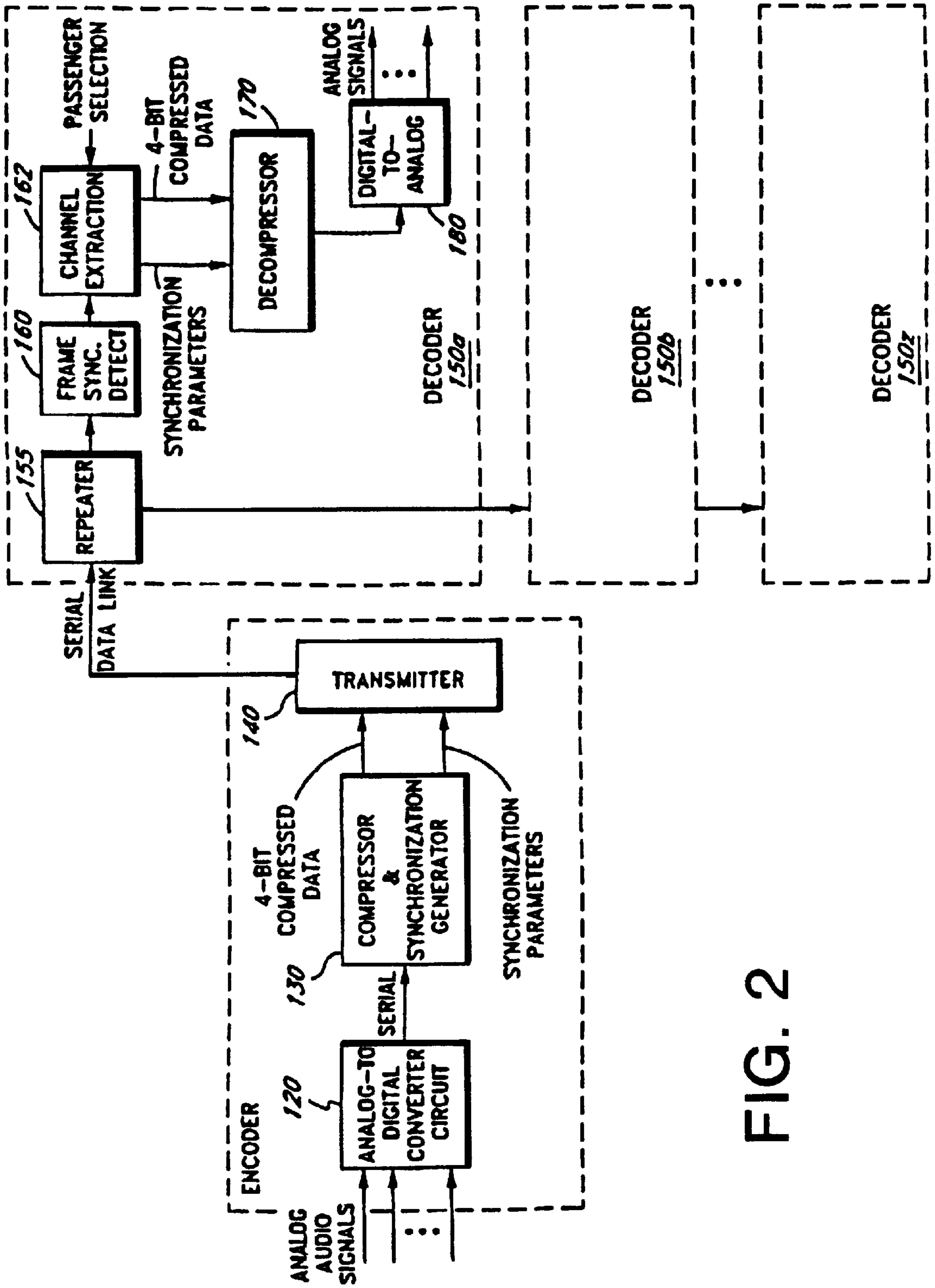
FIG. 2 is a block diagram illustration of one embodiment of an encoder-decoder system that operates in accordance with the teachings of the present invention.

FIG. 2 shows an illustration of one embodiment of the present invention. The system consists of encoder 110 and decoder 150. Encoder 110 receives analog audio inputs from a number of audio channels. The analog signals are digitized by an analog-to-digital (A/D) converter circuit 120. The digitized data are fed to Compression Engine and Sync Generator 130 to compress the data based on the ADPCM protocol and generate the synchronization parameters. The ADPCM technique to compress 16-bit audio data to 4-bit data is well known in the art. A suitable reference is the "Recommendation for Standardized Digital Audio Interchange Format" by the IMA Digital Audio Technical Working Group, Revision 2.11, Jul. 14, 1994. The entire data for all channels and the synchronization parameters form a data frame. There are two types of synchronization parameters: (1) frame synchronization, and (2) data synchronization. The frame synchronization parameters include a sync header which contains a unique bit pattern, distinguishable from other bit patterns in the frame, to allow the receiver to detect the beginning of a frame. The data synchronization parameters include a channel number, the ADPCM index and the ADPCM predicted sample value of the data sample for that channel number. The data synchronization parameters allow the receiver to update its ADPCM parameters for decompression. The term synchronization here refers to the periodic update of ADPCM parameters so that lost information, if any, can be recovered on a real-time basis. Essentially, the receiver synchronizes its decompression of the data samples from the specified channel based on the data synchronization parameters. The compressed data and the synchronization parameters are fed to transmitter 140 for transmission through a transmission medium such as a serial data link to a chain of decoders. Each decoder is responsible for generating analog audio signals to each seat group.

At each decoder, there is a repeater that repeats the serial data stream to be transmitted to the next decoder in the chain. At decoder 150*a*, repeater 155 regenerates the serial data to be forwarded to decoder 150*b*, and to frame synchronization detector 160 which performs frame synchronization and locates the compressed patterns. The data synchronization parameters then replace the corresponding parameters used in the decompression. The compressed data and the synchronization parameters are fed to decompressor engine 170 to decompress the ADPCM compressed patterns. The audio decompressed 16-bit data are converted to analog signals by the digital-to-analog (D/A) converter circuit 180, to be sent to the passenger seats.

Figure 3:
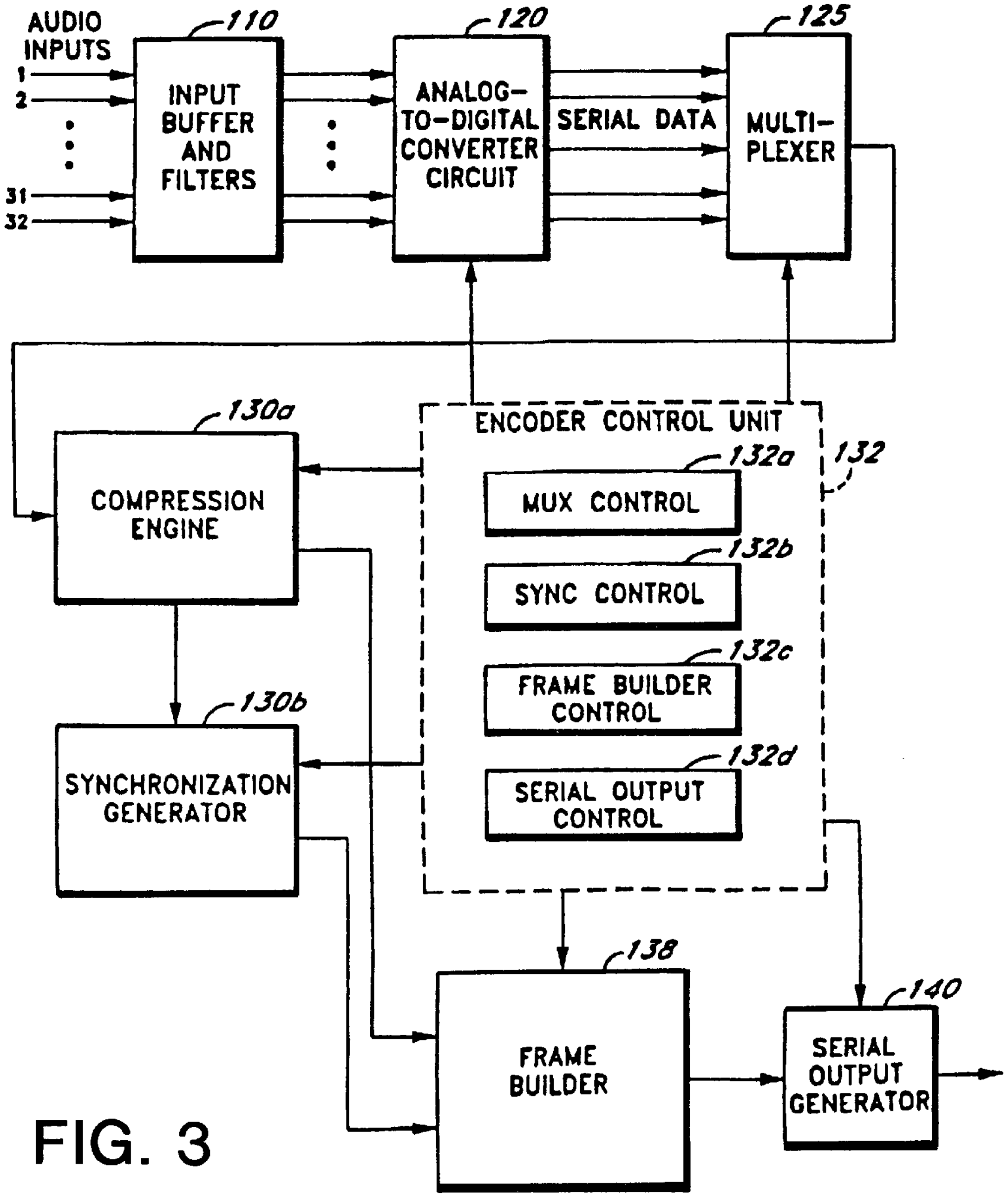
FIG. 3 is an illustration of one embodiment of the encoder.

FIG. 3 is an illustration of one embodiment of the encoder. In one embodiment of the present invention, there are 32 audio channels from which a passenger can select. Buffering and filtering subsystem 110 performs analog buffering, signal conditioning, and anti-aliasing filtering on these audio analog signals. The filtered analog signals are digitized by analog-to-digital (A/D) converter circuit 120. A/D converter circuit 120 consists of 32 individual A/D converters that digitize 32 analog signals simultaneously. In this embodiment, the A/D converter has a part number CS5330-KS and is manufactured by Crystal Semiconductor at Austin, Tex. The output of each A/D converter is serialized. The clocking and control signals to A/D converter circuit 120 come from Encoder Control Unit 132. Digital multiplexer 125 selects the serial data under the control of Encoder Control Unit 132. The serial data are fed to Compressor engine 130*a* which performs ADPCM encoding. The encoding essentially produces the compressed data. The compressed data are then merged with the synchronization parameters generated by synchronization generator 130*b*. The synchronization parameters include the frame synchronization parameter (the frame sync header) and the data synchronization parameters for a selected channel. From these compressed data and synchronization parameters, frame builder 138 creates a frame to be transmitted. A frame is created by appending all 32 four 4-bit ADPCM patterns and an 8-bit checksum to the synchronization parameters. The frame data are serialized by serial output generator and transmitter 140 for transmitted through the serial data link to the decoder.

Encoder control unit 132 generates timing and control signals to compression engine 130*a*, sync generator 130*b*, frame builder 138 and serial output generator and transmitter 140. Encoder control unit 132 consists of at least: (1) multiplexer control sub-unit 132*a* to control A/D converter subsystem 120 and digital multiplexer 125, (2) sync control sub-unit 132*b* to control compression engine 130*a* and sync generator 130*b*, (3) frame control sub-unit 132*c* to control frame builder 138, and (4) serial data control sub-unit 132*d* to control serial output generator 140. In the preferred embodiment, encoder control unit 132, compressor engine 130*a*, synchronization generator 130*b*, and fram builder 138 are implemented using Field Programmable Gate Array (FPGA) technology. The FPGA has the part number XC4008E-4PQ160I and is manufactured by Xilinx at San Jose, Calif. The serial output generator 140 includes the serial data transmitter, part number ADM 1485JR, which is manufactured by Analog Devices at Norwood, Mass.

Figure 4:
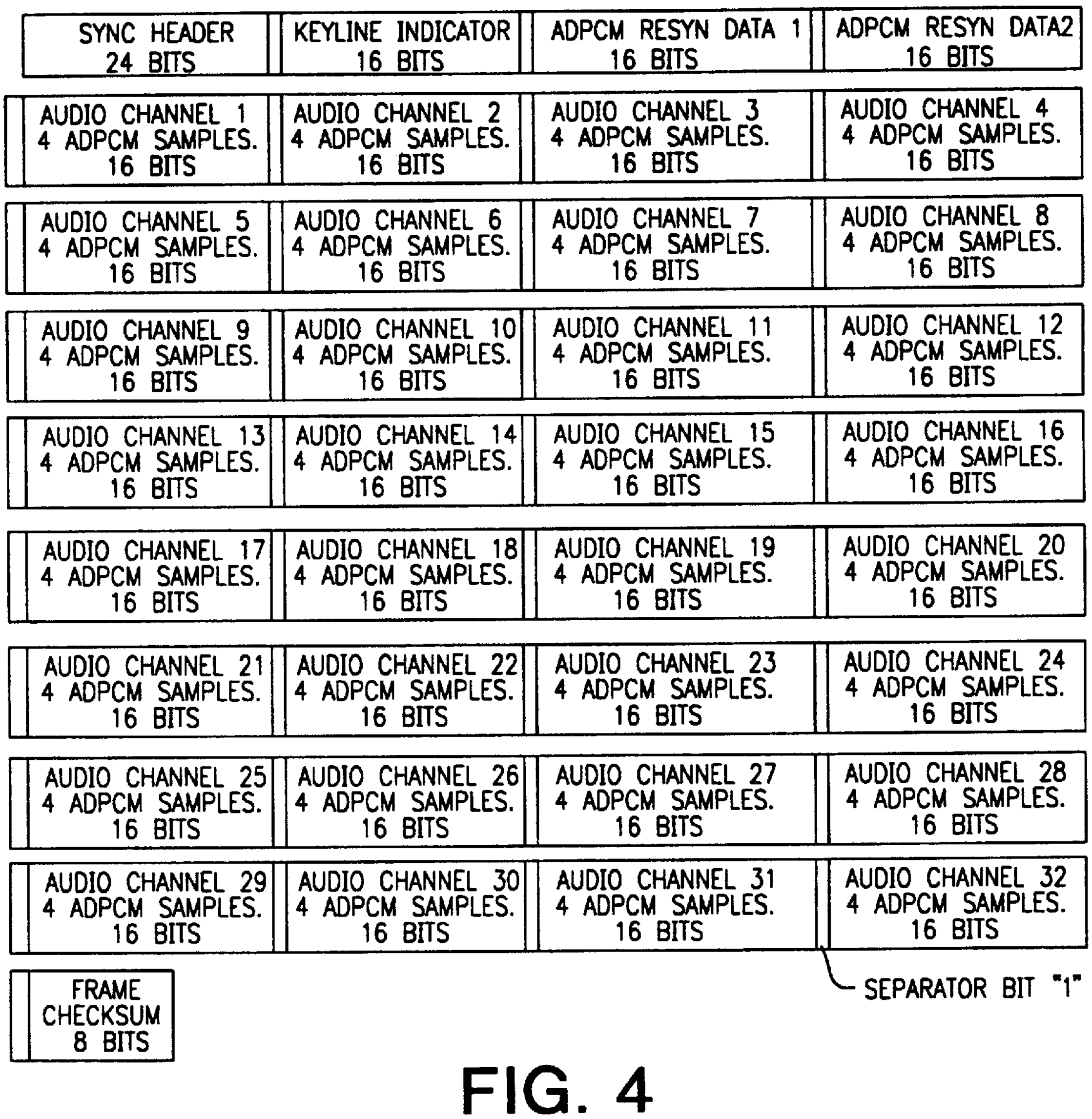
FIG. 4 is an illustration of the frame format.

FIG. 4 is an illustration of the frame format. In this embodiment, a frame consists of 628 bits divided as follows:

Synchronization parameters (72 bits): Sync header (24 bits), keyline indicator (16 bits), ADPCM Sync Data 1 (16 bits), and ADPCM Sync Data 2 (16 bits). The keyline indicator is used for status information and for general-purpose use. The sync header is the frame synchronization parameter. The ADPCM Sync Data 1 and ADPCM Sync Data 2 form the data synchronization parameters for a selected channel.

ADPCM data (512 bits): 32 channels, each channel has 4 ADPCM samples, each sample is 4-bit for a total of 16 bits per channel.

Frame checksum: 8-bit checksum data for the entire frame.

Separator bits: At the start of each 16-bit data after the sync header and at the start of the 8-bit frame checksum, there is a separator "1" bit, for a total of 36 bits. These separator bits are employed to ensure that other than the sync header, a frame cannot contain any string having more than 16 consecutive zeros.

Figure 5:
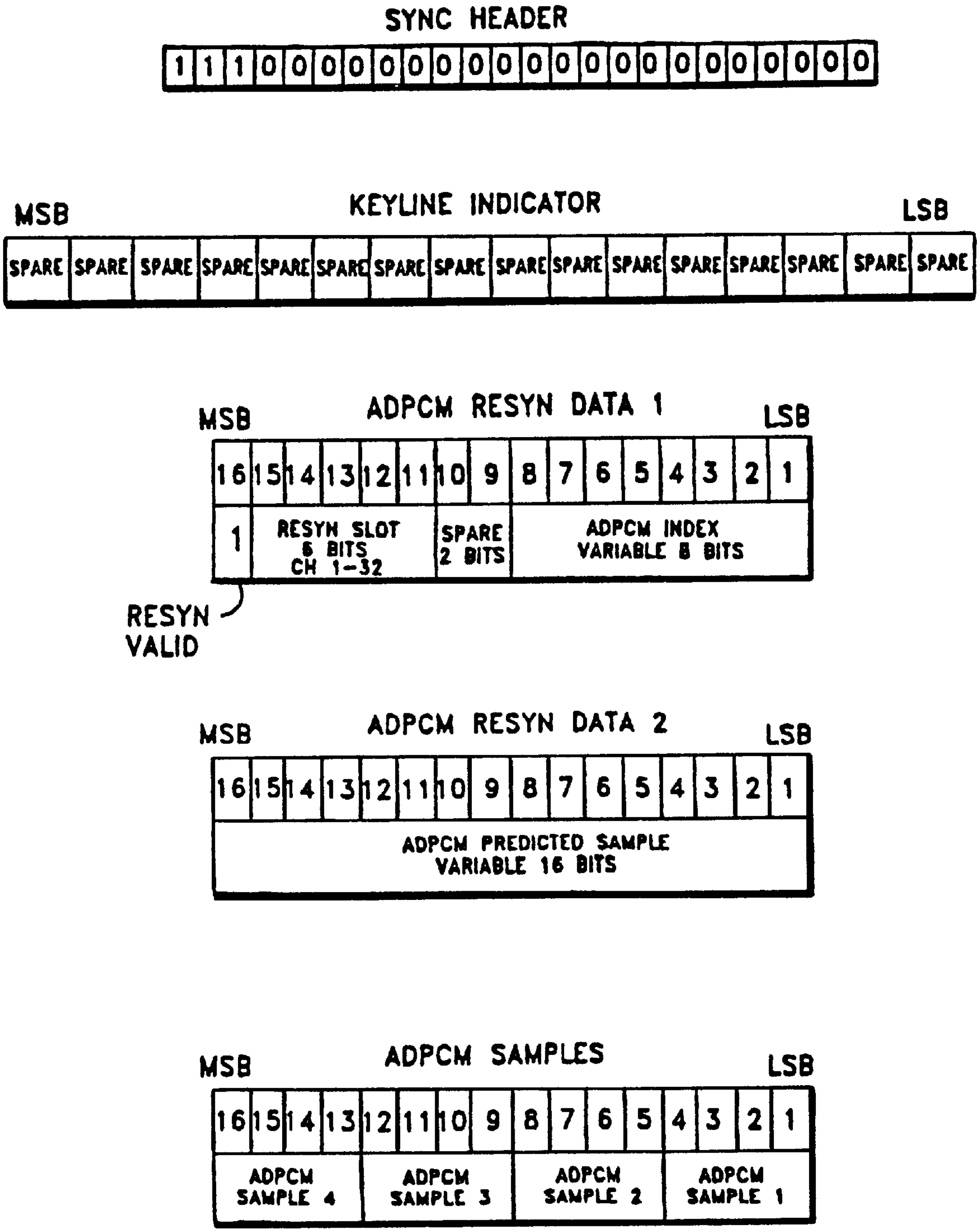
FIG. 5 is an illustration of the format of the synchronization parameters and the ADPCM samples.

FIG. 5 is an illustration of the format of the synchronization parameters and the ADPCM samples.

In the preferred embodiment, the sync header bit pattern is "1 1 1 0 0 0 0 0 0 0 0 0 0 0 0 0 0 0 0 0 0 0 0 0"

Since the separator bits ("1" bits) are placed at the start of every 16 bits and the 8-bit checksum, the above bit pattern is unique to the sync header because it contains 21 consecutive zeros.

The keyline indicator is used to indicate if a particular channel keyline is active. Extra bits are reserved for future use, such as status indicators (e.g., switch ON/OFF). It is also available for other general-purpose uses.

The ADPCM Sync Data 1 has 16 bits:

Bit 15 (MSB): VALID bit, 1 if Valid, 0 otherwise.

Bits 10–14: Channel number, 5 bits for 32 channels.

Bits 8–9: spare.

Bits 0–7: ADPCM index variable corresponding to the channel number (bits 10–14).

ADPCM Sync Data 2 is the 16-bit ADPCM predicted sample variable of the audio sample corresponding to the channel number specified in ADPCM Resync Data 1.

The ADPCM samples are 16-bit, divided into four 4-bit ADPCM samples.

The audio data stream to be transmitted represents the sequence of the data frames with the above format.

The time sequence for transmission of the frames is shown below:

| Time t | Frame | |
|---|---|---|
| 1 | Sync data for channel 1 at time t = 1 | |
| | Channel 1: | 4 ADPCM samples at t = 1 |
| | Channel 2: | 4 ADPCM samples at t = 1 |
| | . . . | |
| | Channel 32: | 4 ADPCM samples at t = 1 |
| 2 | Sync data for channel 2 at time t = 2 | |
| | Channel 1: | 4 ADPCM samples at t = 2 |
| | Channel 2: | 4 ADPCM samples at t = 2 |
| | . . . | |
| | Channel 32: | 4 ADPCM samples at t = 2 |
| 32 | Sync data for channel 32 at time t = 32 | |
| | Channel 1: | 4 ADPCM samples at t = 32 |
| | Channel 2: | 4 ADPCM samples at t = 32 |
| | . . . | |
| | Channel 32: | 4 ADPCM samples at t = 32 |
| 33 | Sync data for channel 1 at time t = 33 | |
| | Channel 1: | 4 ADPCM samples at t = 33 |
| | Channel 2: | 4 ADPCM samples at t = 33 |
| | . . . | |
| | Channel 32: | 4 ADPCM samples at t = 33 |

At each frame time, all 32 channels are transmitted but only one set of channel synchronization parameters is sent. The same channel is synchronized every 32 frames. In one embodiment of the present invention, the bit rate is approximately 5.1 Megabits per second (Mbps). Each frame consists of 628 bits. The frame time is approximately 122.88 microseconds. A synchronization period of 32×122.88 microsecond=3.9 milliseconds (ms) is sufficiently small so that any loss of sync can be corrected without noticeable interruption.

Figure 6:
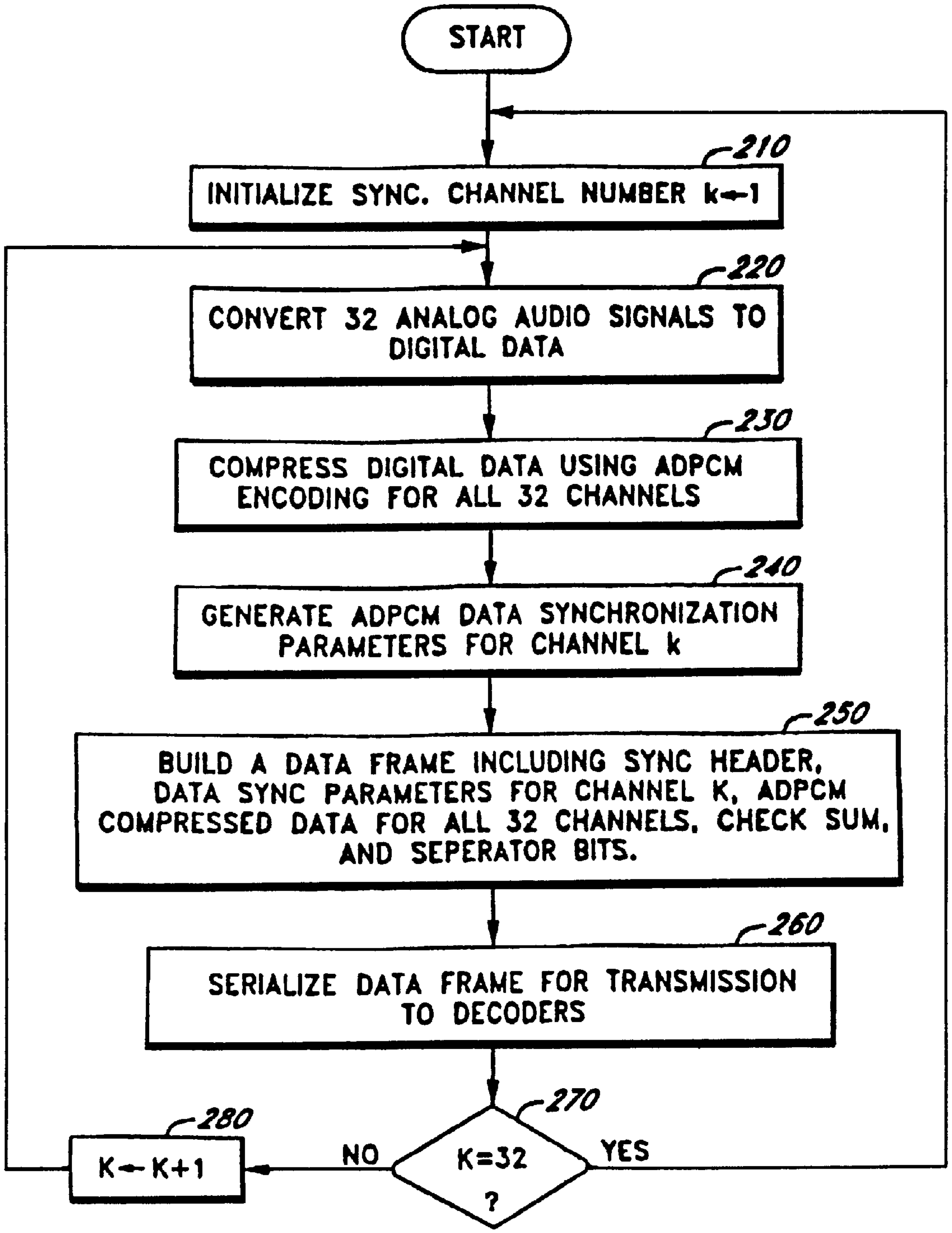
FIG. 6 is a flowchart illustrating the encoding process.

FIG. 6 is a flowchart illustrating the encoding process. In step 210, the channel number k to be synchronized is initialized to channel number 1. In step 220, all 32 analog audio signals are converted to digital data. In step 230, all digital data from 32 channels are compressed using the ADPCM encoding procedure. In step 240, the ADPCM parameters for decompression are generated as the data synchronization parameters for channel k. In step 250, a data frame is created by combining the compressed data for 32 channels, the frame synchronization parameter, the data synchronization parameters, the checksum and separator bits. In step 260, the created data frame is serialized to be transmitted to the decoders. In step 270, a determination is made to determine if the synchronization channel number has reached 32. If the channel number has reached 32 indicating that all 32 channels have been synchronized, control returns back to step 210 to start from channel 1 again. In step 280, the channel number has not reached 32 yet, so the channel number is incremented to the next channel number and control returns back to step 220. The process is repeated for the entire period of audio transmission program.

Figure 7:
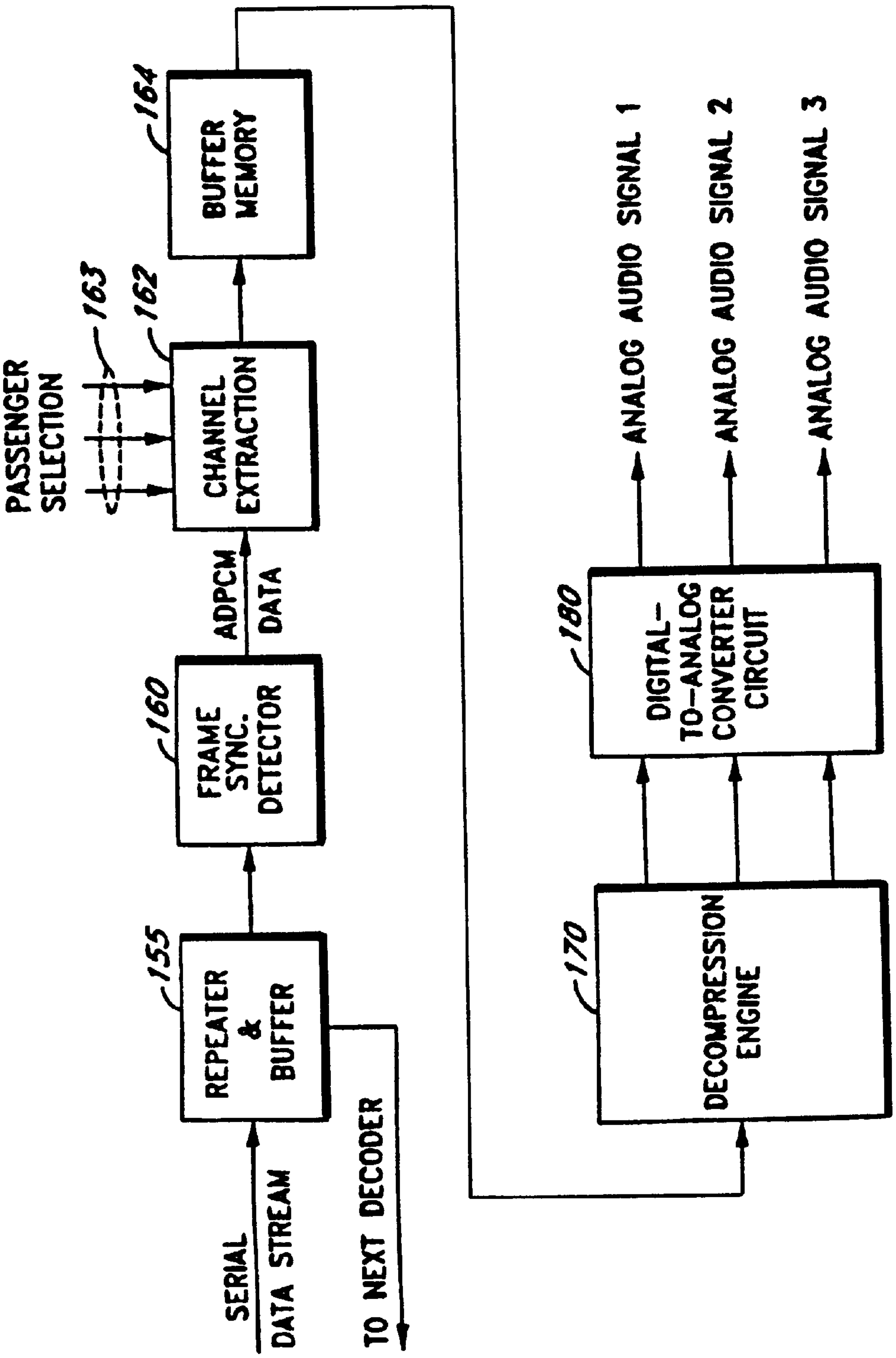
FIG. 7 is an illustration of one embodiment of the decoder.

FIG. 7 is an illustration of one embodiment of the decoder. The decoder receives serial data from the serial data link. Repeater 155 regenerates the serial data stream to be forwarded to another decoder within the decoder chain. Repeater 155 also buffers the serial data to maintain the logic level and the driving capability of the serial bus drivers.

Frame synchronization detector 160 detects the synch header and locates the ADPCM data sequence. After detecting the presence of the frame synchronization parameter in the sequence, frame synchronization detector 160 removes the frame synchronization parameter and passes the data synchronization parameters and the ADPCM compressed data for further processing. The data synchronization parameters contain a channel number, the ADPCM index variable and the ASDPCM predicted sample value for the compressed data corresponding to the specified channel.

Channel extraction circuit 162 obtains the ADPCM compressed data corresponding to the audio channels selected by the passengers on the passengers' selection lines 163. In a typical IFES environment, an SEU interfaces to a seat group consisting of two or three passenger seats. At any time, up to three passengers may select any channel. The channel select inputs go to channel extraction circuit 162. Each ADPCM compressed pattern corresponding to a channel selected by a passenger selection is converted to parallel data segments. These data segments are stored in buffer memory 164.

Buffer memory 164 stores segments of ADPCM audio data for each selected audio channel, together with the data synchronization parameters for the specified sync channel number. The size of buffer memory 164 is sufficiently large to store data of all selected channels and the data synchronization parameters within the specified time period. Buffer memory 164 may be implemented by conventional static random access memory (SRAM) devices in a double-buffered organization or first-in-first-out (FIFO) devices. Essentially, a double-buffered memory consists of two blocks of memory. In a particular frame time, one block is used for writing and one block is used for reading. In the next frame time, the role of each block is reversed: the block used for writing in the previous frame time is used for reading, and the block used for reading in the previous frame time is used for writing. The process is repeated such that data are read out to buffer memory 164 in a continuous manner to decompression engine 170.

Decompression engine 170 decompresses ADPCM data to reproduce the original digitized audio data. The decompression uses the ADPCM index variables and ADPCM predicted samples to reconstruct the original samples. At any time, all the ADPCM index variables and ADPCM predicted samples for all channels are available for decompression engine 170. However, at each frame time, the ADPCM index variable and the ADPCM predicted sample of one channel are updated by the data synchronization parameters. Although only one channel is updated at each frame time, a different channel is updated in the next frame time such that all 32 channels are updated over 32 frame times. After that, the process is repeated so that a particular channel is updated once every 32 frame times. This updating process essentially works to synchronize the ADPCM data for the specified channel. In the preferred embodiment, Repeater 155, Frame synchronization detector 160, channel extraction circuit 162, and decompression engine 170 are implemented on the FPGA part number XC4010E-4PQ160I, manufactured by Xilinx at San Jose, Calif.

Each decoder is depicted to be capable of generating three data streams corresponding to three passenger seats in each seat group. Obviously, other numbers of seats are readily achievable. The decompressed data are next converted to analog signals by three, or an appropriate number, digital-to-analog (D/A) circuit 180. In the preferred embodiment, the D/A circuit 180 is the CS4333-KS device, manufactured by Crystal Semiconductor at Austin, Tex. The digital-to-analog conversion is done in a time division multiplexing manner. At the end, three analog signals are available continuously to be transmitted to the requesting passengers.

Figure 8:
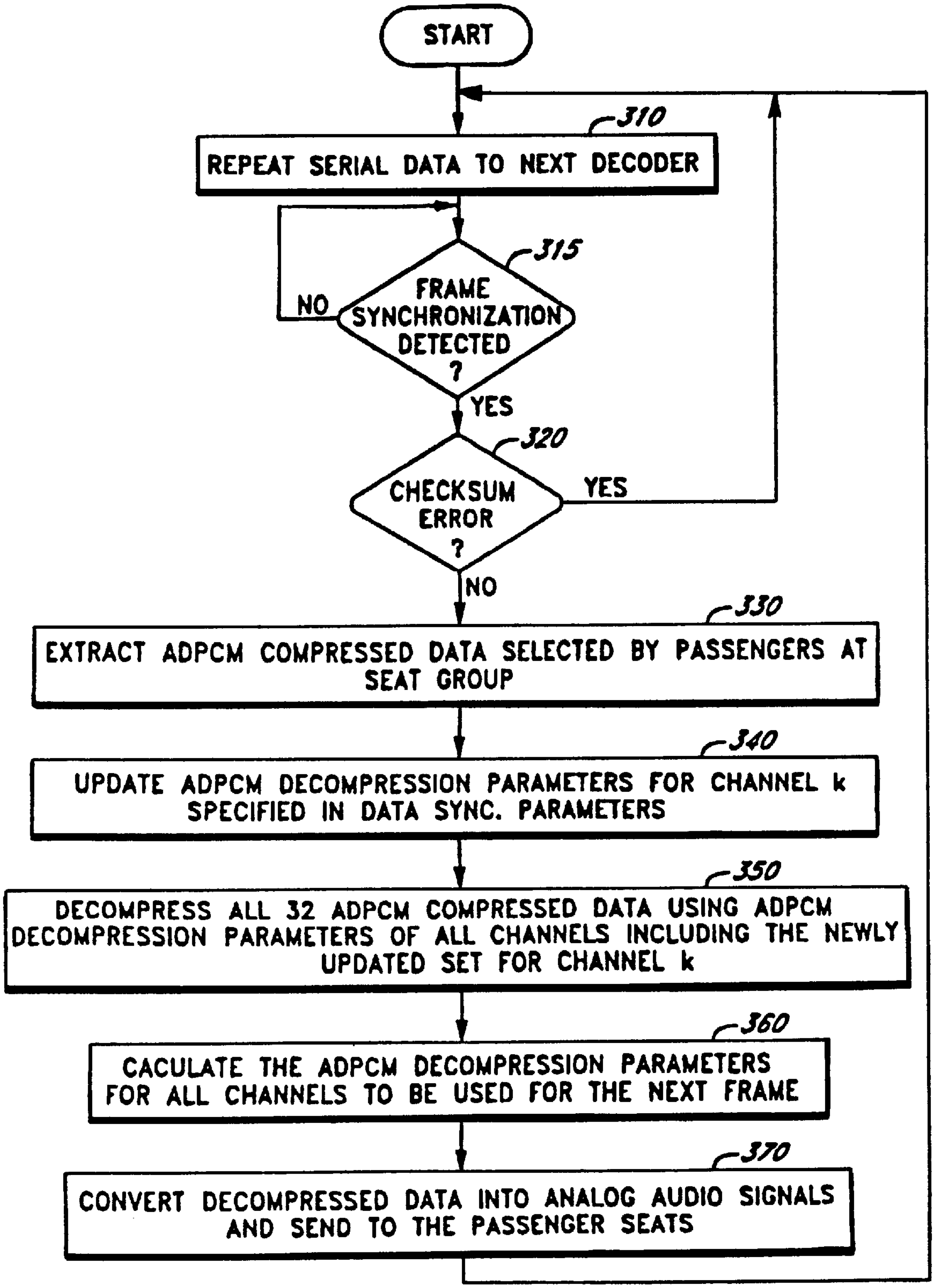
FIG. 8 is a flow chart illustrating the decoding process.

FIG. 8 is a flowchart illustrating the decoding process. In step 310, the received serial data is repeated to the next decoder in the chain. In step 315, a determination is made to determine if the frame synchronization is detected. If not, control returns back to step 315 to continue the inquiry. If frame synchronization is detected, a determination is made to determine if there is checksum error in step 320. If there is checksum error, the entire frame is discarded in step 325 and control goes back to step 310 for the next frame. If there is no checksum error, the ADPCM compressed data as selected by passengers at the corresponding passenger seats are extracted in step 330. In step 340, the ADPCM data synchronization parameters in the data frame replace the calculated decompression parameters for channel k specified in the data sync parameters. In step 350, all 32 ADPCM compressed data are decompressed using the decompression parameters of all channels including the newly updated set for channel k. In step 360, the ADPCM decompression parameters for all channels are calculated to be used for the next frame. In step 370, the decompressed digital data are converted into analog audio signals to be sent to the passenger seats. The process is then repeated for the next frame in step 310.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. In an aircraft in-flight entertainment system (IFES) having a plurality of available audio signals, an audio distribution system for transmitting and synchronizing a first audio data stream corresponding to said plurality of audio signals to be provided to a plurality of passenger seats in response to a plurality of passenger requests, said audio distribution system comprising:

an encoder, coupled to a source providing said plurality of audio signals to generate a compressed data pattern and a plurality of synchronization parameters, said plurality of synchronization parameters including synchronization data for a selected channel, said compressed data pattern and said plurality of synchronization parameters forming the first data stream and transmitted over a transmission medium; and a decoder coupled to said transmission medium for decompressing said compressed data pattern and synchronizing said first audio data stream by said synchronization parameters.

2. The system of claim 1 wherein said encoder further comprises:

a buffering and filtering circuit for receiving said plurality of audio signals to produce a plurality of filtered audio signals;

an analog-to-digital converter circuit coupled to said buffering and filtering circuit for digitizing said plurality of filtered audio signals and generating a second audio data stream;

a multiplexer coupled to said analog-to-digital converter circuit for selecting a subset of said second audio data stream;

a compression engine coupled to said multiplexer for generating said compressed data pattern from said first subset;

a synchronization generator coupled to said multiplexer and said compression engine for generating said plurality of synchronization parameters;

a frame builder coupled to said compression engine and said synchronization generator for building a data frame;

a serial output generator coupled to said frame builder for generating said first audio data stream representing said data frame over said transmission medium; and an encoder control unit for controlling said analog-to-digital converter circuit, said multiplexer, said compression engine, said synchronization generator, said frame builder, and said serial output generator.

3. The system of claim 2 wherein said analog-to-digital converter circuit includes a plurality of analog-to-digital converters which perform conversion of said plurality of filtered audio signals in parallel.

4. The system of claim 2 wherein said data frame includes said plurality of synchronization parameters, said compressed data pattern, a plurality of separator bits and a frame checksum.

5. The system of claim 1 wherein said decoder further comprises:

a repeater circuit coupled to said transmission medium for regenerating said first audio data stream;

a synchronization detector circuit coupled to said repeater circuit for detecting said plurality of synchronization parameters and reproducing said compressed data pattern;

a channel extraction circuit coupled to said synchronization circuit for extracting, from said compressed data pattern and said plurality of synchronization parameters, a selected data pattern and a subset of said synchronization parameters corresponding to a plurality of passenger selections;

a buffer memory coupled to said channel extraction circuit for storing said selected data pattern and said subset;

a decompression engine coupled to said buffer memory for receiving and decompressing said selected data pattern using said subset and producing a plurality of selected audio data; and a digital-to-analog converter circuit coupled to said decompression engine for converting said plurality of selected audio data to analog audio signals to be delivered to said plurality of passenger seats.

6. The system of claim 5 wherein said buffer memory is one of a double-buffered memory and a first-in-first-out (FIFO) memory.

7. The system of claim 5 wherein said digital-to-analog converter circuit converts said plurality of selected audio data in a time division multiplexing (TDM) manner.

8. The system of claim 1 wherein said transmission medium includes a serial data link.

9. The system of claim 1 wherein said encoder generates said compressed data pattern using an adaptive differential pulse code modulation (ADPCM) technique.

10. The system of claim 1 wherein said plurality of synchronization parameters include a frame synchronization parameter and a set of data synchronization parameters.

11. The system of claim 10 wherein said frame synchronization parameter includes a frame header.

12. The system of claim 10 wherein said frame synchronization parameter includes a keyline indicator for indicating if a keyline channel is active.

13. The system of claim 10 wherein said set of data synchronization parameters include a selection of an audio channel.

14. The system of claim 10 wherein said set of data synchronization parameters include an ADPCM index variable corresponding to a channel selection.

15. The system of claim 10 wherein said set of data synchronization parameters include an ADPCM predicted sample variable corresponding to a channel selection.

16. The system of claim 1 further comprises a first plurality of individual passenger's control units (PCUs) coupled to a first Seat Electronics Unit (SEU) to enable audio channel selection.

17. The system of claim 1 further comprises a second plurality of individual passenger's control units (PCUs) coupled to a second Seat Electronics Unit (SEU) to enable audio channel selection.

18. In an aircraft in-flight entertainment system (IFES) having a plurality of audio signals transmitted in an audio distribution system, a method for transmitting and synchronizing a first audio data stream corresponding to said plurality of available audio signals to a plurality of passenger seats via a plurality of seat control unit (SCU) in response to a plurality of passenger requests, said method comprising the steps of:

encoding said plurality of audio signals to produce said first audio data stream, said first audio data stream consisting of at least a compressed data pattern and a plurality of synchronization parameters, said plurality of synchronization parameters including synchronization data for a selected channel;

transmitting said first audio data stream over a transmission medium;

recovering said first audio data stream at an SCU; and decoding said first audio data stream to reproduce said plurality of audio signals by decompressing said compressed data pattern and synchronizing said first audio data stream by said plurality of synchronization parameters.

19. The method of claim 18 wherein said step of encoding further comprising:

buffering and filtering said plurality of audio signals to produce a plurality of filtered audio signals;

digitizing said plurality of filtered audio signals to generate a second audio data stream;

selecting a first subset of said second audio data stream;

compressing said first subset to produce said compressed data pattern;

generating said plurality of synchronization parameters; and building a data frame.

20. The method of claim 18 wherein said decoding step further comprising:

repeating said first audio data stream;

detecting said plurality of synchronization parameters;

reproducing said compressed data pattern after said plurality of synchronization parameters is detected;

extracting from said compressed pattern a plurality of compressed data and a second subset of said synchronization parameters corresponding to a plurality of passenger selections;

storing said plurality of compressed data and said second subset;

decompressing said plurality of compressed data using said second subset to produce a plurality of selected audio data; and converting said plurality of selected audio data to analog audio signals to be delivered to said plurality of passenger seats based on said plurality of passenger requests.

21. The method of claim 18 wherein said compressed data pattern is generated using an adaptive differential pulse code modulation (ADPCM) technique.

22. The method of claim 18 wherein said compressed data pattern is decompressed using an adaptive differential pulse code modulation (ADPCM) technique.

* * * * *